June 21, 1955 H. J. SCHULTZ ET AL 2,711,446
PHONOGRAPH PICKUP AND OTHER ELECTRIC CONTROL DEVICES
Filed Nov. 18, 1952 6 Sheets-Sheet 6

INVENTORS
HENRY J. SCHULTZ
MELVERN ORTON
BY
ATTORNEY

United States Patent Office 2,711,446
Patented June 21, 1955

2,711,446

PHONOGRAPH PICKUP AND OTHER ELECTRIC CONTROL DEVICES

Henry J. Schultz, Hayward, and Melvern Orton, Alameda, Calif.

Application November 18, 1952, Serial No. 321,241

15 Claims. (Cl. 179—100.41)

This invention relates to an improved phonograph pickup and other electric control devices of the type employing a fluid current-modulating medium.

In the type of pickup to which this invention relates, the phonograph needle is mounted on an actuator member which is swung in a small arc as the needle moves back and forth laterally in the record groove. The swinging of the actuator is used to modulate an electric current that flows between two or more electrodes through an electrolytic fluid contained in cavities or cells in a body member made of insulating material.

A preferred pickup construction divides the body member into three serially adjoining cavities—each containing an electrode and liquid. The central cavity is joined to the other cavities by a pair of orifices whose areas are varied by the actuator member in response to the movement of the needle. (Heretofore, each orifice has been formed between a wall of the chambers and a flexible diaphragm which yielded to pressure exerted by the movement of the actuator member and tended to resume its shape when the pressure was relaxed by movement of the actuator member in the opposite direction.) Each time the orifice changes in size, the electrical resistance between adjacent chambers changes, varying the current flow and voltage between them. In a pickup having three chambers, a difference in electric potential can be set up across the electrodes in the end chambers, and a varying voltage can be obtained from the electrode in the central chamber. This variation, obtained by varying the areas of the orifices between the central chamber and the other two chambers, causes the voltage on the electrode in the central chamber to increase and decrease relatively to the potential of the other two electrodes, although voltage between these two electrodes remains constant.

The present invention is an improvement in this type of construction and solves several problems which had not been solved heretofore.

This invention greatly reduces the manufacturing cost of the above explained type of phonograph pickup and enables it to be produced from a smaller number of simpler parts. For example, heretofore the best pickup of this type was made up of fourteen parts and involved the assembly of ten different parts or sub-assemblies. Some of the parts were very complicated in nature and had to be made in expensive dies. Some of the assembly was tricky, involving extreme accuracy and very delicate hand operations. The present invention may be made up of eight parts, all told, and involves the assembly of only three sub-assemblies or pieces. The parts themselves are simpler than the parts that were heretofore used, and their assembly takes only a fraction of the time heretofore required. The only operations that are necessary in assembly are gluing two of the pieces together and snapping a third piece onto them.

One feature of the present invention is that the armature (the actuator which carries the needle) floats on or in the rubber diaphragm. This floating action makes it possible to control the swing of the armature or actuator directly by molding it into the diaphragm, so that its stroke is effectively damped within whatever predetermined limits may be desired. It also makes it possible to eliminate bearings on the pickup body member and in the armature itself. It eliminates the requirement of special members for holding the actuator in position, members for regulating the compliance of the armature, and stop members for limiting the movement of the armature, because the diaphragm itself holds the armature in alignment and proper adjustment, and controls its compliance and stop action. In this way, the compliance and stop action can be properly regulated at the time of manufacture, and no adjustment needs to be made during assembly operations or thereafter.

This structure of the armature also saves expense, labor, and time in making and reproducing the dies by which the armatures and body members are stamped out, eliminates subsequent shaping operations for the armature and the jigs formerly required in those operations, eliminates intricate forming of the body member with bearings and recesses for straps and bumper parts, and eliminates the straps, separate compliance blocks, and the bumper members. All this is done with no sacrifice in the performance characteristics of the device and, in fact, there is improved control of performance.

Another main feature of this invention is that the gap area is molded into the rubber diaphragm. Heretofore the gap area lay between the diaphragm and the body member and was formed either by having a loose fit between the two or by providing a trough in the body member, the trough being an improvement over the structure in which loose fit was relied upon. However, in the present invention there is no need for having either a loose fit or a trough in the body member, because the gap or orifice itself is molded directly in the diaphragm. For one thing, this saves dies and makes it possible to use other types of material for the body member instead of having to use material capable of being intricately formed with sharp edges and narrow parts that tend to break. With the present invention, the body member could be made from glass, a fact which alone makes it possible to reduce the cost of the body member to a fraction of what it has been heretofore.

Another very important effect of having the gap area molded is that it makes gluing a very simple operation instead of the delicate matter that it was formerly. Then, great care had to be taken not to have any glue in the orifice area, particularly on the sharp edges where the trough was formed in the body member. If too much glue was applied to the diaphragm or the body member before the two were glued together, and if this glue went into the critical area, the performance characteristics of the device were affected so much that the pickup cartridge had to be thrown away. With the present invention very little care is necessary. The glue may be applied to the diaphragm with a roller, and the diaphragm may then be stuck on the body member. At all points where the two approach they are glued together, and this is possible because the gap does not lie in between the diaphragm and the body member, but actually passes through a portion of the diaphragm member. The gap or orifice may be said to float, because it is independent of the rigid body.

The time that this structure saves in assembly, the amount that it saves in the cost of dies, the reduction of the number of skilled personnel necessary to assemble the parts, and the tremendous reduction in the amount of time which assembly takes, are all very significant advantages of the present invention.

Another important problem solved by the present invention is that of compression set. Heretofore, ideal response could be obtained only by having the actuator at all times pressed down against the diaphragm, so as to urge a portion of the diaphragm into the troughs at all times. The result was that some "cold flow" or "compression set" occurred, permanently depressing the diaphragm and increasing the depression more and more progressively, narrowing the gap and reducing the output available. Also, the same phenomenon tended to cause any unbalance that existed to become more and more accentuated as time went on. Many cartridges were ruined by this phenomenon.

The present invention has solved that problem, because the actuator exerts no pressure on the diaphragm so long as it is at rest. Only when the device plays is there any pressure exerted, and that is normally but a small fraction of the total life of any cartridge; also, the playing pressures are normally balanced automatically. This important problem and all the difficulties it caused, practically evaporated when the present structure was devised.

Other objects and advantages of the invention will appear from the following description of some preferred forms thereof given in accordance with United States revised statutes, section 4888, and in order that anyone skilled in the art may learn how to make the device. The details of structure given and the specification of particular materials are illustrative and are not intended to limit the claims narrowly.

*General description of the pickup cartridge shown in Figs. 1 to 16*

Figures 1, 14:
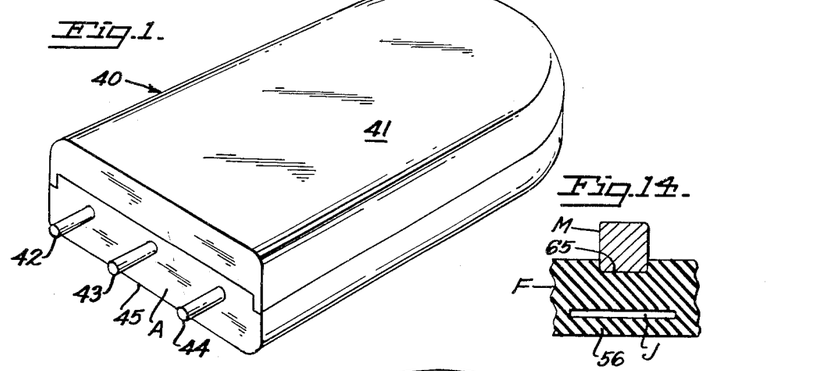
Fig. 1 is an isometric view of an assembled pickup cartridge incorporating the principles of the present invention.
Fig. 14 is a greatly enlarged view in elevation and in section of a portion of Fig. 12, showing how the diaphragm, actuator, and gap are related at the time the actuator is in its neutral position.
Figures 2, 15:
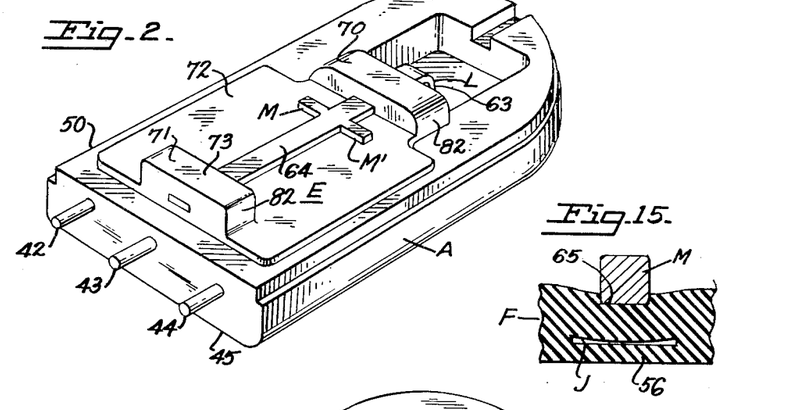
Fig. 2 is a view similar to Fig. 1 with the top covering removed, showing the armature and diaphragm in place on the body member.
Fig. 15 is a view similar to Fig. 14, showing the shape of the gap or orifice when the presser foot above it is in its depressed position.
Figures 3, 16:
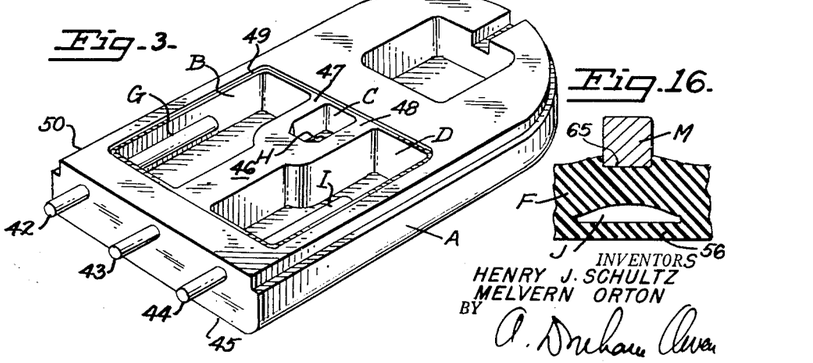
Fig. 3 is a view similar to Fig. 2 with the diaphragm and actuator removed, showing the body member with the cavities therein.
Fig. 16 is a view similar to Fig. 14 showing the shape of the gap when the presser foot above it is in its raised position.
Figure 4:
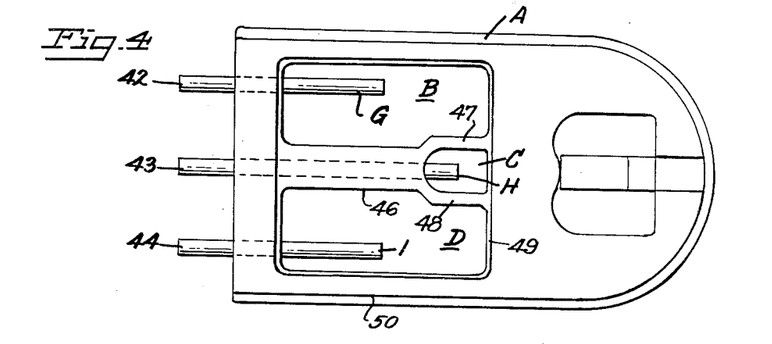
Fig. 4 is a top plan view of the body member shown in Fig. 3.

The pickup cartridge 40 includes a body member A with chambers B, C, and D filled with electrolytic liquid E and covered with a resilient diaphragm F. In each chamber B, C, and D is a respective electrode G, H, and I. When electrodes G and I are connected to a source of electric potential, an electric current flows between them by way of the variable area gaps or orifices J and K formed through the diaphragm F in the portions of the diaphragm F which overlie the partitions between the chambers B, C, and D. The size of the orifices J and K at any moment is controlled by an armature L with presser feet or levers M and M'.

The outer end of the armature L holds the needle N. As the needle N is moved from side to side by a record groove, the armature L moves in a small arc normal to its longitudinal axis. This side-to-side movement moves the presser feet M and M' so that first the portion of the diaphragm above one orifice J is further depressed while the portion of the diaphragm above the other orifice K is opened somewhat, and then the opposite action occurs. When the orifice J is made smaller the electrical resistance between the electrodes G and H is increased; at the same time, the widening of the orifice K decreases the resistance between the electrodes H and I. These changes vary the voltage on the electrode H which is used as the output voltage of the pickup 40. When the orifice J is opened and the orifice K is made smaller, the reverse situation exists between the electrodes. Thereby, the shape of the record groove, which conforms to the original sound that was recorded, is faithfully transmitted by the pickup cartridge to the phonograph amplifier system and to the loud speaker.

*The assembled cartridge (Fig. 1)*

When fully assembled the cartridge 40 may appear as shown in Fig. 1, ready to be clamped into a tone arm (not shown). The body member A which contains or supports all the working parts is then covered by a cap 41 which protects the working parts and prevents tampering. Preferably the body member A and the cap 41 are permanently secured together as by cementing, but if desired, they may be secured removably, as by a snap fit, to enable disassembly for inspection of the device. The only parts that project beyond the cartridge 40 are the needle N at the front and the three terminals 42, 43, 44 for the three electrodes G, H, and I. Of these, the outer terminals 42 and 44 are usually connected to oppositely polarized sources of direct current, and the center terminal 43 (which is the cartridge output terminal) connects to the voltage input for the amplifier or for the speaker (not shown).

*The body member A and the fluid cavities B, C, and D, (Fig. 3)*

Both the body member A and the cap or covering 41 are preferably made from a hard, rigid, strong plastic or from glass or from hard rubber, or from some other suitable material which is an electrical insulator. The body member A may be molded, if desired, and is provided with suitable cavities, openings, and so on, which will be described as the occasion arises. One feature of the present invention is that the body member A may be very simple, due to the structure of the novel diaphragm F. So long as the body member A has a reasonably flat upper surface so that the partitions may be glued to the flat lower edge of the diaphragm, it is unnecessary for it to have any particular intricacies other than the cavities B, C, and D. This contrasts strikingly with body members which have heretofore been required, because they were relatively complex in form and could be molded satisfactorily only in expensive dies and only from special types of plastics.

The exact shape of the three liquid-holding cavities or chambers B, C, and D is not critical, so long as the central chamber C borders the outer chambers B and D. The central chamber C may be substantially smaller than the other chambers, because the electrode H in the central chamber C carries no direct current.

The chambers B, C, and D are open only at their upper ends, their lower ends being closed by the lower wall 45 of the body A. A central partition 46 separates the chambers B and D from each other where they are adjacent, and the partitions 47 and 48 separate the central chamber C from the outer chambers B and D. The upper surfaces of these partitions 46, 47, 48 are preferably perfectly flat and preferably lie on substantially the same plane as the outer rim 49 around the chambers. This outer rim 49 of the chambers may be recessed somewhat, with respect to the outer edge 50 of the body member A itself, to provide a good method of centering and aligning the diaphragm F, but this is not necessary.

The electrodes

The electrodes G, H and I may be simply round copper wire molded into the body member A so that they are tightly sealed therein. The outer terminals 42, 43, 44 project outside the body member A, and the electrodes themselves are respectively in the three chambers B, C, and D. Other forms of electrodes may be used if desired, and so may other metals or types of material.

The liquid E

The finished cartridge incorporates a suitable electrolytic liquid E or other electrically conductive liquid into the chambers B, C, and D. The liquid E may be applied before or preferably after the diaphragm F has been secured to the body A. In the latter instance, it may be applied through a hypodermic needle or through a hole which is later sealed. The particular liquid forms no part of the present invention.

The diaphragm F

The diaphragm F contrasts rather strikingly with diaphragms heretofore used in pickups of this general type. Formerly, flat sheets of rubber latex, or of other forms of rubber, were used, and reliance was made upon the intricate formation of the body member A and upon having special members hold the armature L. In the present invention, the body A and armature L are simpler than heretofore, and the diaphragm F is more complicated. However, the diaphragm material has been found to be easier to mold than the body material.

The material from which the diaphragm F is formed does not comprise any part of the present invention. Actually, it is preferably a complex type of rubber or rubber-like material, its exact composition depending on the desired use. When used in the claims, the term "rubber" will be understood to include synthetic rubber-like polymers.

Figure 5:
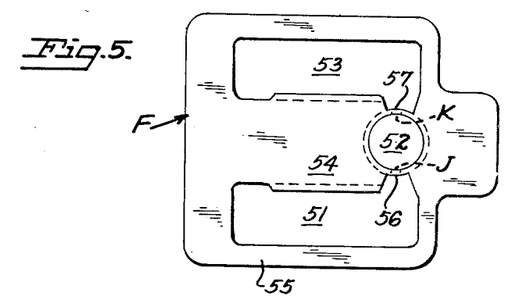
Fig. 5 is a bottom plan view of the diaphragm of this invention with a portion of the actuator shown projecting from each end, the portion at one end being broken off in order to conserve space.

As the bottom plan view of Fig. 5 shows, the diaphragm F is preferably recessed to form three cavities 51, 52, and 53, which directly overlie the cavities B, C, and D in the body member A. Cavities 51 and 53 are separated from each other by a wide central partition 54 which lies on the same level as the diaphragm's outer rim 55.

A rather narrow, and in this case, arcuate partition 56 separates the recess 51 from recess 52, and a similar partition 57 separates the recesses 52 and 53. Through these two partitions 56 and 57 are formed the passages, orifices, or gaps J and K which connect the chambers B, C, and D in series and whose variation in size by the armature L is what actuates and controls the electric current passing through the pickup. The shape of these gaps J and K is important, but a variety of shapes may be used to give different results, depending on what is wanted. What will be wanted, depends upon the type of an amplifier system to be used or whether any amplifying system is to be used. It will also depend on whether or not the device is to be used as a phonograph pickup or as a transducer for some other purpose, as for a microphone. Some of these shapes are shown in Fig. 14, and in the Fig. 17 series. So far as the general principles of this invention are concerned, any shape at all may be used. Satisfactory performance has been obtained from rectangular orifices that were about 0.005" to 0.080" wide, 0.001" to 0.010" high, and 0.001" to 0.200" long. The diaphragm F itself may be about .8" long by .65" wide by 0.41" thick at its thickest middle portions and 0.010" thick at its thinnest portions.

The fact that the gaps J and K extend solely through the diaphragm F and that the bottom surface 58 of the diaphragm F itself is flat, except where recessed to reach the fluid cavities, means that it is a very simple operation to glue the diaphragm F to the body A. The glue may simply be rolled on, and it will adhere only to the nonrecessed portions of the diaphragm. The shape of the outer rim 55 and its width and the shape and width of the partitions 55, 56, and 57 need not correspond exactly to the shape of the partitions 46, 47, and 48 and rim 49 of the body member A, so long as they generally coincide over enough area so that they can be secured and sealed together.

The actuator or armature L and its relation to the diaphragm F

Figures 6, 7, 8:
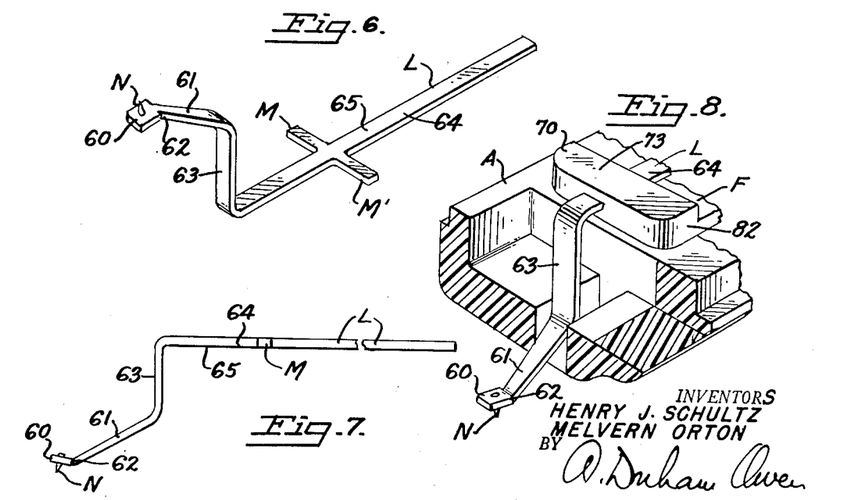
Fig. 6 is an isometric view of the actuator member looking at it from below.
Fig. 7 is a view in side elevation of the actuator member.
Fig. 8 is an isometric view of a fragment of the front portion of the body member, with some portions being cut away to show the actuator more clearly.
Figure 9:
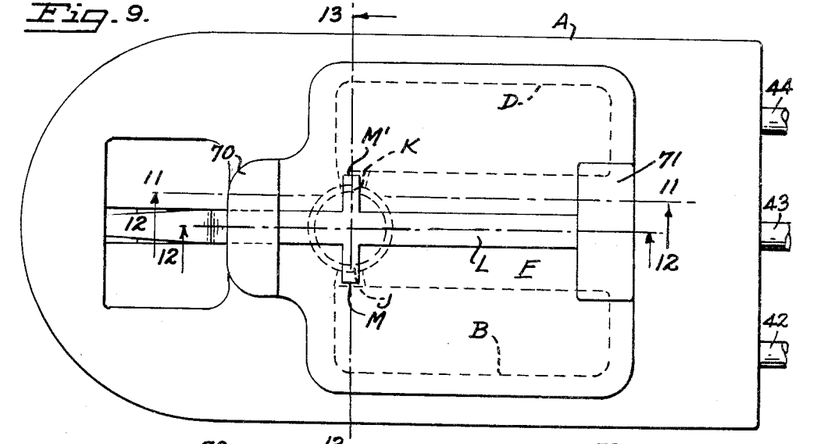
Fig. 9 is a top plan view of the device in the same state of assembly as that shown in Fig. 2.
Figure 10:
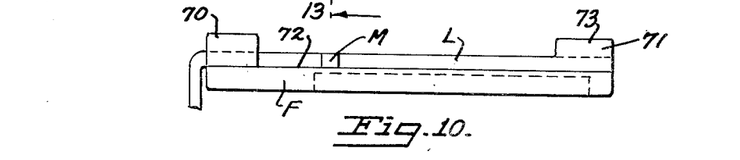
Fig. 10 is a view in side elevation of the diaphragm and of a portion of the actuator, the bottom portion thereof being broken off in order to conserve space.
Figure 11:
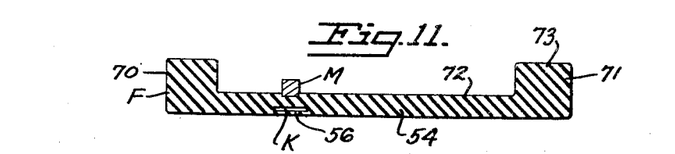
Fig. 11 is a view in section taken along the line 11—11 in Fig. 9.
Figure 12:
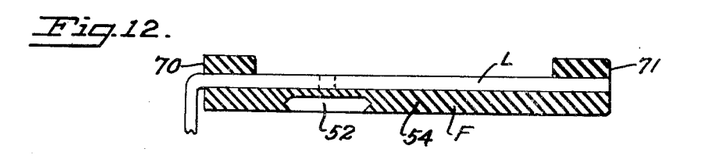
Fig. 12 is a view in section taken along the line 12—12 in Fig. 9.
Figure 13:
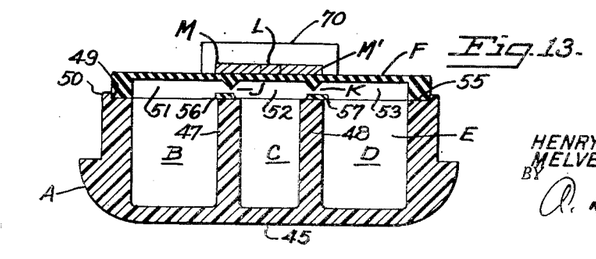
Fig. 13 is a view in section taken along the line 13—13 in Fig. 9.
Figure 17A:
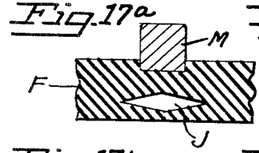
Figs. 17a, 17b, 17c, 17d, 17e, 17f, 17g, 17h, and 17i are views similar to Fig. 14, showing various other shapes of gaps which may be used and some alternative shapes of actuator side arms.
Figure 17B:
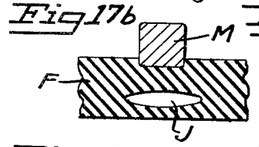
Figure 17C:
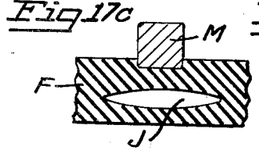
Figure 17D:
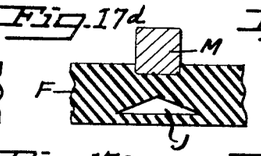
Figure 17E:
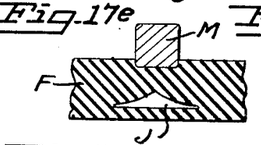
Figure 17F:
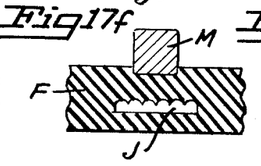
Figure 17G:
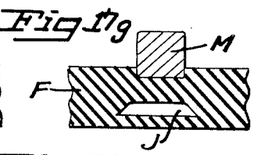
Figure 17H:
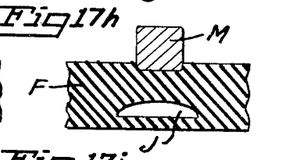
Figure 17I:
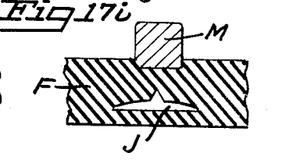

The armature L is preferably an integral, relatively rigid member and is usually made from metal. At its forward end it terminates in a chuck 60 that holds the needle N, the chuck 60 preferably being inclined forwardly as shown. Rearwardly from the chuck 60 a shank 61 is inclined back about 30 degrees to the horizontal, the angle 62 between the portions 60 and 61 being about 139 degrees. A generally vertical stem 63 joins the shank 61 to a longitudinally extending stem 64. The actuator may be stamped out from a piece of metal, and this invention does away with intricate formations such as bearings and variations in width, required by the prior art.

The actuating arms, levers, or presser feet M and M' extend out at right angles to the actuator stem 64 and may be on the same level as the stem 64 or may be bent down somewhat lower if desired.

The actuator L is made up in advance and is preferably placed in the mold in which the diaphragm F is molded. When the diaphragm F has been molded, the armature L and diaphragm F are thence forward one piece. Preferably, the entire lower surface 65 and the lower edges of the stem 64 and of the side arms M and M' are bonded to the diaphragm F. However, this is not essential except as to the feet M and M'. The rest of the actuator L may rest on top of the diaphragm F, the bonding being a preferable means of preventing any displacement in position between the armature L and diaphragm F.

Figure 25:
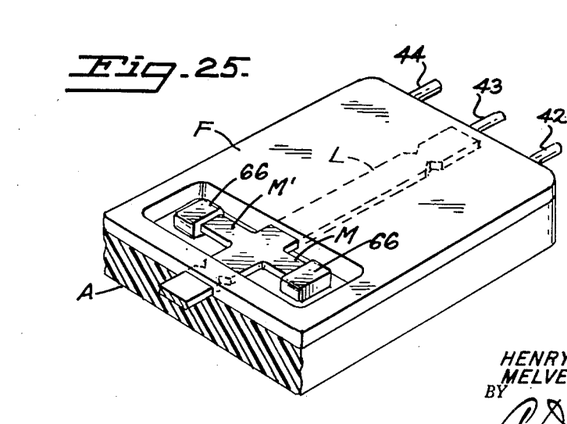
Fig. 25 is an isometric view of another modified form of the invention.

When used in the claims, the term "bonding" or "bonded" includes cementing, gluing, vulcanization, and other methods of attaching the armature L or the presser levers M and M' to the diaphragm F. For example, one alternative method of securing the levers M and M' to the diaphragm path is shown in Fig. 25 where pockets 66 are molded in the diaphragm either over the arms M and M' so as to vulcanize them together or completely separate, the arms M and M' then being slipped into the pockets 66 at a later time. In any event, so far as the levers M and M' are concerned, the essential thing is that they not only depress the diaphragm when they are bent down (the depressing does not require any bonding), but that they also lift the diaphragm when they are tilted or otherwise raised above their normal or neutral position.

It is practically essential that the armature M be restrained in some manner from moving too far, because if it swings too far the sound reproduction is distorted. Actually, in operation, a movement of about .001 of an inch of the needle causes a movement of about .0002 of an inch at the actuator arm, but if the swing of the armature exceeds the amount which is determined in the size of the orifices J and K, then one orifice may be being closed faster than the other one is being opened, so that the device is thrown off balance and the armature being closed may be closed beyond a point where the response is linear. Therefore, great care had been taken in devices heretofore in use to provide damper means such as bumpers for restraining the movement of the actuator L within limits. In the present invention, the fact that the armature L is molded directly into the rubber, either completely or partially, means that stop action may be provided without any additional parts.

At each end of the diaphragm, integral blocks 70, 71 may be formed integrally with the diaphragm F and project up from the rest of the upper surface 72 thereof. The armature L is completely enclosed at each end in these blocks 70, 71 and the compliance of the armature L and its accurate positioning are assured thereby. By making the blocks longer (i. e., along the edges 82), more rigidity is introduced and the compliance is reduced. By making the blocks shorter, the compliance is increased. Satisfactory performance has been obtained from blocks 70, 71 that were about .110 thick, from the bottom edge 58 of the diaphragm F to their top edge 73.

The valving action of the diaphragm and armature combination is illustrated somewhat by Figs. 14, 15 and 16. Normally, the actuator arm is fully relaxed (Fig. 14), so that the gaps J and K are their normal size. Under pressure, the orifices J and K are narrowed, as shown in Fig. 15. Then, upon release of pressure, the actuator arms M and M' will pull the diaphragm F up and the gaps J and K will become enlarged to their shape shown in Fig. 16.

Operation

When the device is fully assembled, the needle N may move from side to side in the record groove, thereby swinging the armature L through a small arc. When it does this, the armature L causes one of its presser feet M to be forced down while the other presser foot M' is raised. The presser foot M then causes the gap J to become smaller, while the presser foot M' causes the gap K to become larger. When the needle N swings to the other side of the groove, the opposite effect occurs. In each case, the amount of opening or closing of the gaps J or K is determined by the amplitude of the swing and the frequency of the opening or closing depends, of course, on the frequency recorded in the record groove. This change in shape of the gap causes a change in the voltage between the electrodes G and H and between the electrodes H and I, and this change in voltage, when transmitted from the terminals 46, 47, 48 to the proper amplifier or speaker, emerges in a faithful reproduction of the original sound that was recorded upon the record.

While it is not essential that the recesses 51, 52 and 53 be provided in the diaphragm F, nevertheless, their provision not only increases the amount of fluid which a given cartridge 40 can hold and thereby increases the effective life of the cartridge, but it also insures that the fluid will not fall below the level of the orifices J and K and thereby introduce distortion. In addition to this safeguard, there are other ways in which the device may be protected from internal pressures.

Figure 18:
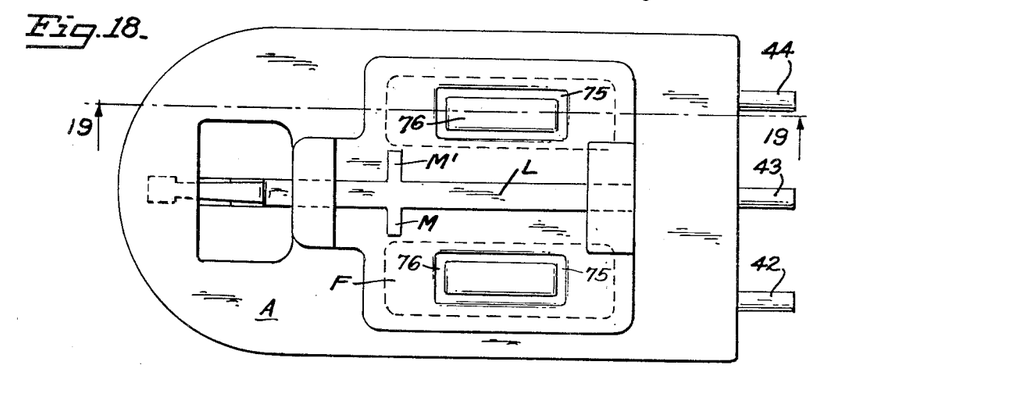
Fig. 18 is a view similar to Fig. 9 of a modified form of the invention.
Figure 19:
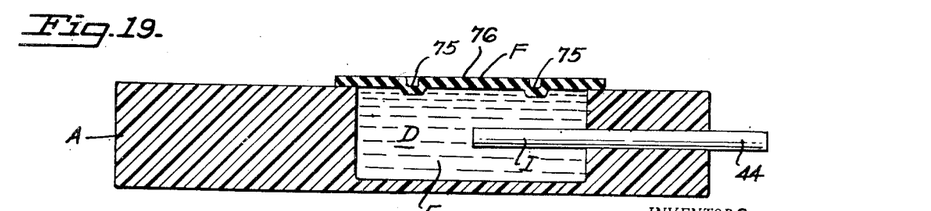
Fig. 19 is a view in section taken along the line 19—19 in Fig. 18.

Modified form of the invention (Figs. 18 and 19)

In some cases the liquid E inside the pickup cartridge 40 tends to expand under temperature changes, or an air bubble may get in which would tend to expand. For example, the device might be used in an airplane or on a railroad train which was going over a mountain range. The expansion might distort the diaphragm F and cause some trouble. In order to prevent this, a bellows arrangement may be incorporated directly into the diaphragm when it is molded. The shape and type of the bellows arrangement may vary, one shape being shown in Figs. 18 and 19, and another in Figs. 20 and 21.

In Figs. 18 and 19 a rectangular portion 75 of the diaphragm is made thinner so that it is flexible and acts as a bellows. Then the portion 76 surrounded by this thin rectangle 75 is more free to move up and down with changes in internal pressure than is the rest of the diaphragm. Consequently, this central portion 76 will take up all the changes of pressure, and they will not affect the gaps J and K.

Figure 20:
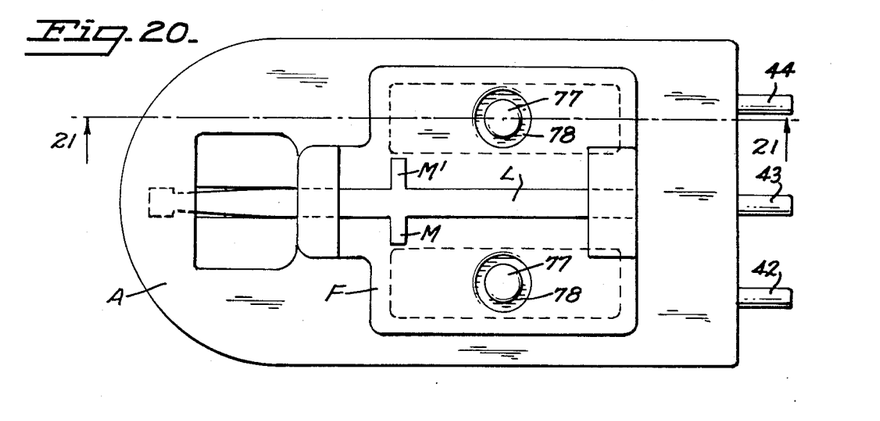
Fig. 20 is another view similar to Fig. 18 of a further modification.
Figure 21:
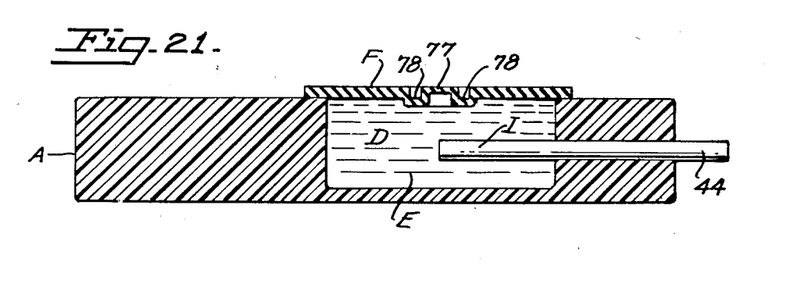
Fig. 21 is a view in section taken along the line 21—21 in Fig. 20.

The circular bellows portion 77 shown in Figs. 20 and 21 accomplishes exactly the same results as that shown in Figs. 18 and 19, being surrounded by the circular thin portion 78. The circular bellows 77 is easier to manufacture than a rectangular bellows, or one of a different shape, although it normally does not make any difference except for ease of manufacture which shape is employed. The reason for the comparative ease of making a circular shape is that the die in which the diaphragm F is molded may have a portion simply turned out on a lathe, jig bore, or mill to give the desired result.

Figure 22:
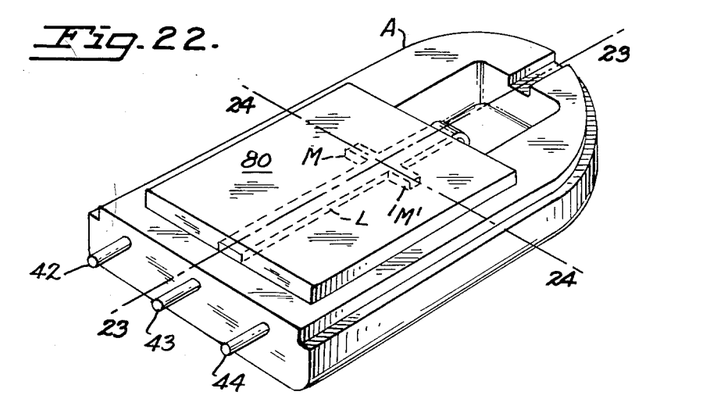
Fig. 22 is a view similar to Fig. 2 of another modified form of the invention.
Figure 23:
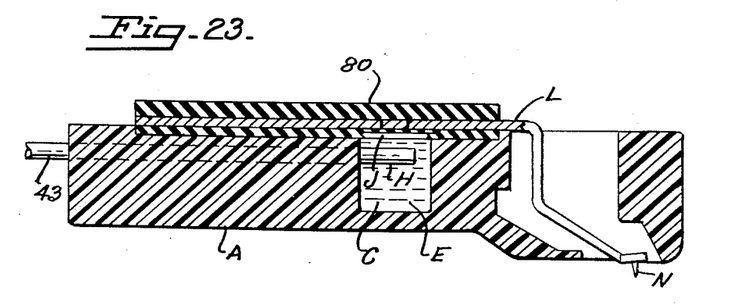
Fig. 23 is a view in section taken along the line 23—23 of Fig. 22.
Figure 24:
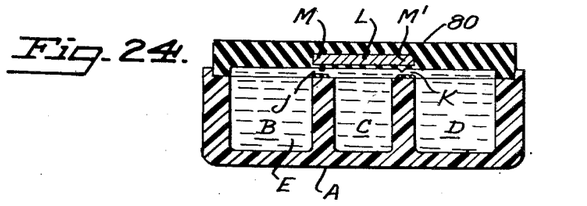
Fig. 24 is a view in section taken along the line 24—24 of Fig. 22.

Another modified form of the invention Figs. 22 to 24

The actuator L, instead of having some portions of the stem and actuator arms exposed, may have these portions completely set in a rubber diaphragm 80 as shown in the device illustrated in Figs. 22, 23 and 24. In this structure, the blocks 70, 71 will not be necessary because the compliance is regulated by the overall thickness of rubber which encircles the actuator L. The thicker the rubber, the less the compliance, and the thinner the rubber over the diaphragm, the greater the compliance. By this means the compliance may be adjusted to any desired degree.

To those skilled in the art to which this invention relates, many changes in construction and widely differing embodiments and application of the invention will suggest themselves without departing from the spirit and scope of the invention. The disclosures and the description herein are purely illustrative and are not intended to be in any sense limiting.

We claim:

1. A control device for electric circuits including in combination: a body of insulating material having a plurality of recessed chambers separated by partitions; an electrode in each of said chambers with a terminal connection outside said chamber; a flexible diaphragm secured to said body and covering said chambers, said diaphragm having a passage therethrough opening at both its ends through the same face joining adjacent chambers, said passage being separated from said body by at least a portion of said diaphragm; an actuator having a member resting against said diaphragm over each said passage; means for varying the pressure by said actuator on said diaphragm to transmit externally originating motion thereto and to vary the area of each said passage; and an electrically conductive fluid filling said chambers and each said passage.

2. The device of claim 1 in which an area of said diaphragm is enclosed by a portion thinner than the remaining portions, so that expansion of said fluid may be compensated for by the expansion of said area rather than by the remainder of said diaphragm.

3. A control device for electric circuits including in combination: a body of insulating material having a plurality of recessed chambers separated by partitions; an electrode in each of said chambers with a terminal connection outside said chamber; a flexible diaphragm secured to said body and covering said chambers, said diaphragm having a passage therethrough opening at both its ends through the same face joining adjacent chambers, said passage being separated from said body by at least a portion of said diaphragm; an actuator having a portion thereof bonded to said diaphragm with a member held to said diaphragm over each said passage for movement therewith; means for varying the pressure by said actuator on said diaphragm to transmit externally originating motion thereto and to vary the area of each said passage; and an electrically conductive fluid filling said chambers and each said passage.

4. A control device for electric circuits including in combination: a body of insulating material having a plurality of recessed chambers separated by partitions; an electrode in each of said chambers with a terminal connection outside said chamber; a flexible diaphragm secured to said body and covering said chambers, and helping to form passages between said chambers; an actuator having a portion thereof bonded to said diaphragm with a member held to said diaphragm over each said passage for movement therewith; means for varying the pressure by said actuator on said diaphragm to transmit externally originating motion thereto and to vary the area of each said passage; and an electrically conductive fluid filling said chambers and each said passage.

5. A control device for electric circuits including in combination: a body of insulating material having a plurality of recessed chambers separated by partitions; an electrode in each of said chambers with a terminal connection outside said body; a flexible rubber diaphragm having recessed portions corresponding generally with said recessed chambers, said recessed portions being separated by partitions integral with said diaphragm, and having a passage between at least two adjacent chambers formed through said diaphragm partitions so that the opening is separated from said body by at least a portion of said diaphragm, said diaphragm being securely sealed against said body; an actuator having a member pressing against said diaphragm over each said passage; means for varying the pressure by said actuator on said diaphragm to terminate externally originating motion thereto and to vary the area of each said passage; and an electrically conductive fluid filling said chambers, recessed portions, and passages.

6. The device of claim 5 in which there are three chambers and in which the center recess of said diaphragm is separated from the side portions by arcuate partitions through which said passages lie.

7. A control device for electric circuits including in combination: a body of insulating material having a plurality of recessed chambers separated by partitions; an electrode in each of said chambers with a terminal connection outside said body; a flexible rubber diaphragm having recessed portions corresponding generally with said recessed chambers, said recessed portions being separated by partitions integral with said diaphragm, and having a passage between at least two adjacent chambers formed solely through said diaphragm partitions so that the opening is separated from said body by a continuous portion of said diaphragm, said diaphragm being securely sealed against said body; an actuator bonded to said diaphragm and partially embedded therein and having a member held against said diaphragm over each said passage; means for varying the pressure by said actuator on said diaphragm to terminate externally originating motion thereto and to vary the area of each said passage; and an electrically conductive fluid filling said chambers, recessed portions, and passages.

8. A control device for electric circuits including in combination: a body of insulating material having a plurality of recessed chambers separated by partitions; an electrode in each of said chambers with a terminal connection outside said chamber; a flexible rubber diaphragm closing said chambers and having recessed portions corresponding generally with said recessed chambers and having an orifice between at least two adjacent chambers formed through said diaphragm so that each said orifice is separated from said body by an integral portion of said diaphragm; an actuator bonded to said diaphragm and having a member pressing against and bonded to said diaphragm over each said orifice; means for varying the pressure by said actuator on said diaphragm to terminate externally originating motion thereto and to vary the area of each said orifice; and an electrically conductive fluid filling the space enclosed by said body and said diaphragm.

9. The device of claim 8 in which said diaphragm is provided at each end on its outer surface with internal blocks of rubber in which said actuator is embedded.

10. A control device for electric circuits including in combination: a rigid body of insulating material having a plurality of recessed chambers separated by partitions; an electrode in at least two of said chambers with a terminal connection outside said chambers; a flexible rubber diaphragm cemented to said body and closing said chambers, said diaphragm being recessed over said recessed chambers and having an orifice joining at least two adjacent chambers, said orifice being formed solely through said diaphragm and separated from said body by at least a portion of said diaphragm; an armature bonded to said diaphragm and having portions covered by a portion of said diaphragm; said armature having levers lying over each said orifice in a position that normally exerts no pressure thereon; means for applying a variable amount of the pressure of said armature on said diaphragm and for lifting said armature a variable amount to transmit externally originating motion thereto and to vary the area of each said orifice; and electrically conductive fluid filling the volume enclosed by said body and said diaphragm.

11. The device of claim 10 in which said armature levers are bonded to said diaphragm.

12. The device of claim 10 in which the upper surface of said diaphragm is provided with a pair of pockets in which said levers fit.

13. A control device for electric circuits, including in combination a body of insulating material recessed from one face to provide three serially adjoining chambers separated by partition walls; an electrically conductive fluid filling said chambers; an electrode in each of said chambers with terminal connections outside said chambers; a flexible diaphragm covering the recessed face of said body and closing said chambers and having formed directly therein and therethrough, out of contact with said body, two orifices, one extending between said center chamber and each of the other two chambers; an armature having portions secured to said diaphragm over said orifices; and means for swinging said armature in response to externally originating motion for widening one said orifice while narrowing the other said orifice.

14. A control device for electric circuits including in combination: a body of insulating material having a plurality of recessed chambers separated by partitions; an electrode in each of said chambers with a terminal connection outside said chamber; a flexible diaphragm secured to said body and covering said chambers, said diaphragm having a passage therethrough opening at both its ends through the same face and joining adjacent chambers, said passage being separated from said body by at least a portion of said diaphragm; an actuator partially embedded in said diaphragm and having at least a portion thereof bonded to said diaphragm, with a member held to said diaphragm over each said passage for movement with said actuator; means for varying the pressure exerted by said actuator on said diaphragm to transmit externally originating motion thereto and to vary the area of each said passage; and an electrically conductive fluid filling said chambers and each said passage.

15. A control device for electric circuits including in combination: a body of insulating material having a plurality of recessed chamber separated by partitions; an electrode in each said chamber with the terminal connection outside said chamber; a flexible diaphragm secured to said body and covering said chambers, said diaphragm having a passage joining adjacent chambers, said passage being separated from said body by at least a portion of said diaphragm; the opposite upper surface of said diaphragm being provided with a pair of pockets; an actuator having cross members fitted into said pair of pockets so that said actuator cross members and the adjacent portion of said diaphragm move together in both directions, said members overlying each said passage; means for varying the pressure by said actuator on said diaphragm to transmit externally originating motion thereto and to vary the area of each said passage; and an electrically conductive fluid filling said chambers and each said passage.

References Cited in the file of this patent

UNITED STATES PATENTS

| | | |
|---|---|---|
| 203,018 | Edison | Apr. 30, 1878 |

FOREIGN PATENTS

| | | |
|---|---|---|
| 134,865 | Great Britain | Nov. 13, 1919 |
| 135,157 | Great Britain | Nov. 13, 1919 |